(12) United States Patent
He

(10) Patent No.: US 11,397,154 B2
(45) Date of Patent: Jul. 26, 2022

(54) MEASUREMENT OF CRYSTALLITE SIZE DISTRIBUTION IN POLYCRYSTALLINE MATERIALS USING TWO-DIMENSIONAL X-RAY DIFFRACTION

(71) Applicant: Bruker AXS, LLC, Madison, WI (US)

(72) Inventor: Bob Baoping He, Hercules, CA (US)

( * ) Notice: Subject to any disclaimer, the term of this patent is extended or adjusted under 35 U.S.C. 154(b) by 206 days.

(21) Appl. No.: 16/939,886

(22) Filed: Jul. 27, 2020

(65) Prior Publication Data
US 2021/0033546 A1 Feb. 4, 2021

Related U.S. Application Data

(60) Provisional application No. 62/881,598, filed on Aug. 1, 2019.

(51) Int. Cl.
*G01N 23/2055* (2018.01)
*G01N 23/207* (2018.01)
*G01N 23/20025* (2018.01)

(52) U.S. Cl.
CPC ....... *G01N 23/2055* (2013.01); *G01N 23/207* (2013.01); *G01N 23/20025* (2013.01); *G01N 2223/0566* (2013.01); *G01N 2223/1016* (2013.01); *G01N 2223/331* (2013.01); *G01N 2223/62* (2013.01); *G01N 2223/641* (2013.01)

(58) Field of Classification Search
None
See application file for complete search history.

(56) References Cited

U.S. PATENT DOCUMENTS

| | | | |
|---|---|---|---|
| 6,709,768 B2* | 3/2004 | Takahashi | G11B 5/66 428/409 |
| 6,882,739 B2* | 4/2005 | Kurtz | G01N 23/20 356/336 |
| 7,182,974 B2* | 2/2007 | Takahashi | G11B 5/66 427/127 |
| 7,885,373 B2 | 2/2011 | Liu et al. | |
| 7,885,383 B1 | 2/2011 | He | |
| 8,111,807 B2* | 2/2012 | Ida | G01N 23/207 378/70 |
| 2003/0012334 A1 | 1/2003 | Kurtz et al. | |
| 2003/0099866 A1* | 5/2003 | Takahashi | G11B 5/64 |
| 2004/0157083 A1* | 8/2004 | Takahashi | G11B 5/84 428/670 |
| 2011/0064199 A1 | 3/2011 | Takashi et al. | |
| 2021/0033546 A1* | 2/2021 | He | G01N 23/207 |

OTHER PUBLICATIONS

Wagendristel, R. et al., "X-Ray Method for the Determination of the Cristallite Size Distribution in Coarse-Grained Samples", Seitschrift für angewandte Physik, vol. 26, No. 4, 1969 (Abstract).

\* cited by examiner

*Primary Examiner* — Thomas R Artman
(74) *Attorney, Agent, or Firm* — Benoit & Côté Inc.

(57) ABSTRACT

An X-ray diffraction method measures crystallite size distribution in a polycrystalline sample using an X-ray diffractometer with a two-dimensional detector. The diffraction pattern collected contains several spotty diffraction rings. The spottiness of the diffraction rings is related to the size, size distribution and orientation distribution of the crystallites as well as the diffractometer condition. The invention allows obtaining of the diffraction intensities of all measured crystallites at perfect Bragg condition so that the crystallite size distribution can be measured based on the 2D diffraction patterns.

10 Claims, 5 Drawing Sheets

MEASUREMENT OF CRYSTALLITE SIZE DISTRIBUTION IN POLYCRYSTALLINE MATERIALS USING TWO-DIMENSIONAL X-RAY DIFFRACTION

BACKGROUND OF THE INVENTION

Field of the Invention

This invention relates generally to the field of X-ray diffraction and, more specifically, to the use of X-ray diffraction for the measurement of crystallites of polycrystalline materials.

Description of the Related Art

The properties of polycrystalline materials are determined by the properties of each crystallite and the boundaries between crystallites. The size of the crystallites in a polycrystalline material has significant effects on many of its properties, including thermal, mechanical, electrical, magnetic and chemical properties. For instance, the mechanical strength of polycrystalline metals and alloys are strongly dependent on the crystallite (grain) size. Recently, crystallite/particle size analysis of pharmaceutical materials has gained more interest, since the crystallite size determines many characteristics of drug substance, including solubility and stability. In many applications, it is very important to know not only the average crystallite size, but also crystallite size distribution (CSD). For instance, in the pharmaceutical industry, crystallite size and size distribution are important parameters for process control in drug research and production, particularly with regard to stability, solubility, permeability, and dissolution in oral drug absorption.

X-ray diffraction has been used for crystallite size measurement for over ninety years, the methods being based on diffraction line broadening and line profile analysis. As used herein, the terms "powder" and "powder X-ray diffraction" refer both to solid polycrystalline materials and to granulated samples. In such materials, crystallite size analysis using a spotty 2D diffraction pattern is based on the diffraction profile in the γ direction, i.e., the direction of the diffracted beam on the diffraction cone. Crystallite size analysis from the full-width at half-maximum (FWHM) of 2θ peaks by the so-called "Scherrer equation" is limited to crystallite sizes below 100 nm, while γ profile analysis is a complementary method which can extend the crystallite size measurement range up to a few millimeters by proper instrumentation and data collection strategy. However, while either the Scherrer equation or the γ profile method can measure the average crystallite/particle size, they cannot determine the size distribution.

SUMMARY OF THE INVENTION

In accordance with the present invention a method is provided for determining crystallite size distribution in a sample of a polycrystalline material. An X-ray diffractometer is used that has an X-ray beam source and a two-dimensional X-ray detector. The sample is then positioned at a first predetermined orientation relative to the X-ray beam source and detector such that crystallites in the sample produce diffraction spots on a detection surface of the detector, with each diffraction spot corresponding to a different crystallite in the polycrystalline material. The intensities of the spots are measured within a defined detection window of the detector that includes a finite range of diffraction angles.

The sample is rotated in a rocking direction relative to the X-ray beam source and the detector, and the intensities of the diffraction spots are measured at each of a plurality of different rocking angles along the rocking direction. The steps over which the rotation occurs are such that an angular separation between adjacent rocking angles allows each diffraction spot to be measured in the detection window at multiple rocking angles. A peak intensity is then recorded for each detected diffraction spot for which the detected intensities both increase and decrease across a continuous range of rocking angles. A corresponding crystallite volume is then calculated from each recorded peak intensity value, and the crystallite size distribution is determined from the calculated crystallite volumes.

The method may be performed in a transmission mode of the diffractometer, although reflection mode may also be used, particularly for thicker samples. The rocking direction may be either of two rocking directions, each of which is an angular direction about a different one of two perpendicular axes. However, the detection window may be sufficiently large that intensity variations of diffraction spots that might be produced if the sample were rotated in the other rocking direction (i.e., by rotation about the second perpendicular axis) are nonetheless detected by the two-dimensional detector. Although the method may measure the intensities of diffraction spots associated with only one diffraction ring, it is also possible to measure intensities from diffraction spots of multiple diffraction rings. The method may also include the measurement of a control sample to determine a calibration factor k prior to measuring the polycrystalline material, the calibration factor being subsequently used in calculating the crystallite volumes.

In one embodiment, the intensities of the diffraction spots are measured only for those diffraction spots for which the intensity exceeds a predetermined threshold value. Another embodiment includes the subtraction of background noise from the detected intensities before recording the peak intensity values. In other variations, the steps of the method, including the intensity measurements and sample rotation, may be repeated using a different starting point on the sample, or repeating the method steps with a different sample of the same material. In either case, the results of the different measurements could then be combined as part of the size distribution determination.

DETAILED DESCRIPTION

Figure 1A:
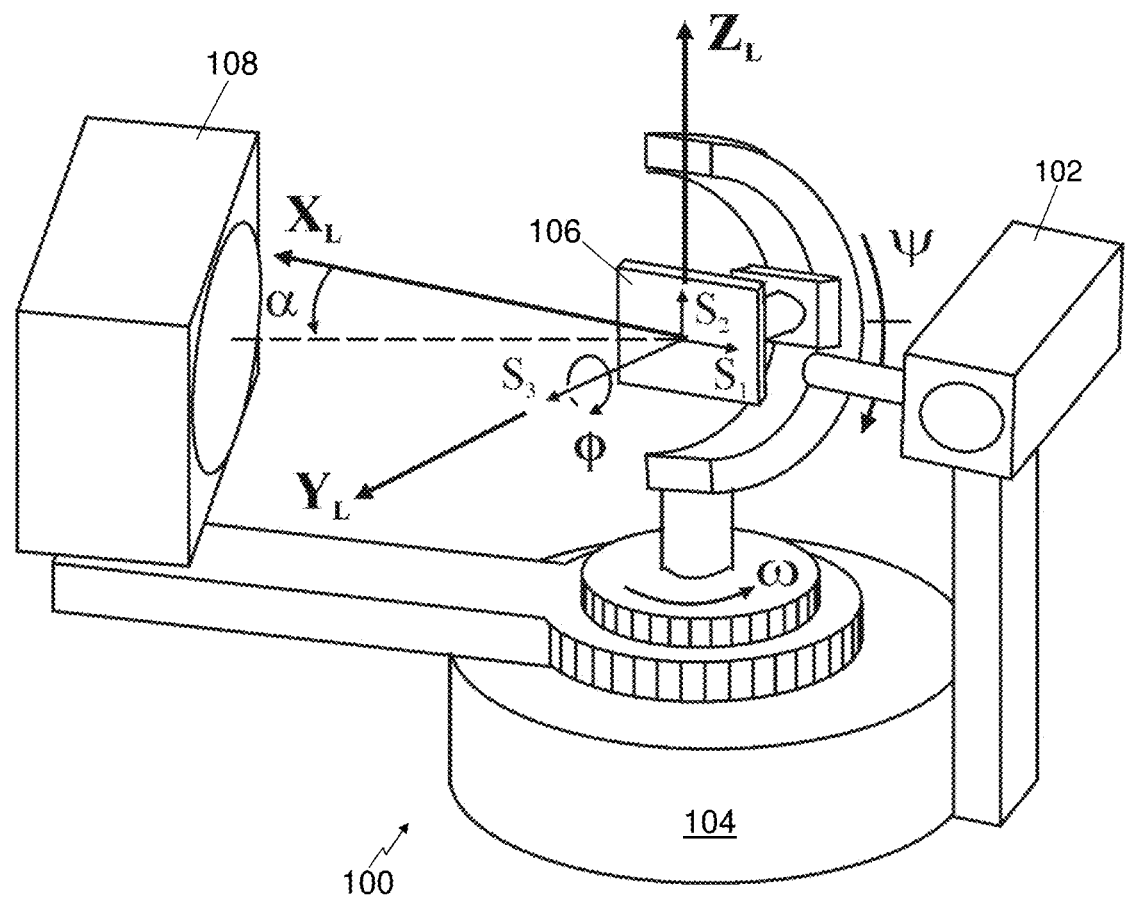
FIG. 1A is a schematic view of an X-ray diffractometry system with a two-dimensional detector that may be used with the present invention.

In the present invention, an X-ray diffractometer with a two-dimensional detector is used to measure the crystallite size distribution. A diffractometry system 100 of this type is shown in FIG. 1A. The components include an X-ray source 102 (with associated optics) that produces a primary X-ray beam with the required radiation energy, focal spot size and intensity. A goniometer 104 is used to establish and manipulate geometric relationships between the incident X-ray beam, a sample 106 located at the goniometer center and a two-dimensional (2D) X-ray detector 108. The incident X-ray beam illuminates the sample 106 and produces scattered X-rays which are recorded by the detector 108.

The configuration of FIG. 1A is known as a horizontal diffractometer, as the rotation angle ω of the sample and the rotation angle α of the detector are in a horizontal plane relative to ground level. The system also has "left-hand" orientation, as the goniometer 100 is mounted in the left side of the x-ray tube and primary optics 102 as observed by the operator. The diffractometer plane is determined by the direction of the primary x-ray beam, which follows the $X_L$ axis and which, in this configuration, is fixed. The change in the w angle is achieved by sample rotation and the α angle is achieved by detector rotation independently. Those skilled in the art will understand that the diffractometer of FIG. 1A is shown herein for descriptive purposes, but that the invention is applicable to other diffractometer configurations as well.

When measuring a polycrystalline sample using a diffractometer like that of FIG. 1A, diffraction spots will be recorded by the two-dimensional detector 108. The invention involves first identifying diffraction spots within a particular diffraction ring by image recognition, and recording their location and intensity. The intensity of a diffraction spot is related to both the crystallite size and orientation. In order to get an accurate measurement of diffraction intensity corresponding to individual crystallites, multiple frames are collected from the sample at various rocking angles. Rocking curves are then constructed from the multiple frames for all measured diffraction spots. The maximum intensity of each spot, which is proportional to the volume of the corresponding crystallite, is determined from the rocking curves. The crystallite size distribution is then evaluated from one rocking scan or from a sum of multiple scans.

A two-dimensional X-ray diffraction ($XRD^2$) pattern from a sample with fine average crystallite size shows a smooth diffraction ring, while the $XRD^2$ pattern from a sample with larger crystallites shows spotty diffraction rings. The crystallite size can be measured by the spottiness of the diffraction ring using γ profile analysis. A detailed explanation of this type of analysis can be found, for example, in Bob He, *Two-dimensional X-ray Diffraction*, $2^{nd}$ edition, John Wiley & Sons, 2018, and the theory behind the method is sometimes described using the metaphor of a "candy box". In this description, the effective diffraction volume, also referred to as gauge volume, can be viewed as a box of candy. As the number of candies necessary to fill the box will depend on the size of the candy and the size of the box, so are the number of spots along the diffraction ring in a given γ range related to the crystallite size (also referred as grain size or particle size).

Based on the effective diffraction volume and the crystallographic nature and crystallite size of the sample, the equation for crystallite size measured in reflection mode is given as:

$$d = \left\{ \frac{3 p_{hkl} A_0 \beta \arcsin[\cos\theta \sin(\Delta\gamma/2)]}{2\pi^2 \mu N_s} \right\}^{1/3} \quad (1)$$

where d is the average diameter of the crystallite particles, $p_{hkl}$ is the multiplicity factor of the diffracting planes, $A_o$ is the cross section of the incident x-ray beam, β is the divergence of the incident X-ray beam, μ is the linear absorption coefficient and $N_S$ is the number of crystallites contributing to the diffraction pattern. The range Δγ is the measured range of the diffraction ring. Introducing a scaling factor covering all the numerical constants, incident beam divergence and calibration factors for the instrument, an equation for the crystallite size measurement in reflection mode may be found as:

$$d = k \left\{ \frac{p_{hkl} b^2 \arcsin[\cos\theta \sin(\Delta\gamma/2)]}{2\mu N_s} \right\}^{1/3} \quad (2)$$

where b is the size of the incident beam and $$k = \left(\frac{3\beta}{4\pi}\right)^{1/3}$$

if the instrumental broadening in the 2θ direction is given, while k is treated as a calibration factor which can be determined from the 2D diffraction pattern of a known standard sample. Since only a limited number of spots along the diffraction ring can be resolved, it can be seen from the equation that a smaller X-ray beam size and low multiplicity peak should be used if smaller crystallite sizes are to be determined.

For measurement in transmission mode with a sample thickness of t, crystallite size may be found using the following equation:

$$d = k \left\{ \frac{p_{hkl_i} b^2 t \arcsin[\cos\theta \sin(\Delta\gamma/2)]}{N_s} \right\}^{1/3} \quad (3)$$

The effective sampling volume reaches a maximum for transmission mode diffraction when t=1/μ. It can be observed from the above equations that the effective sampling volume is proportional to the beam cross-sectional area and is lower for materials with higher linear absorption coefficients. The sample absorption has a different effect on the sampling volume in reflection and transmission modes.

In reflection mode, the linear absorption coefficient determines how fast the incident beam is attenuated within the sample, but there is no clear cutoff for the penetration depth. Therefore, the effective sampling volume has to be used. In transmission mode with the incident beam perpendicular to the sample surface, the linear absorption coefficient affects the relative scattering intensity, but not the actual sampling volume. In other words, all of the sample volume within the beam path contributes to the diffraction. Therefore, it is reasonable to ignore the absorption effect for crystallite size analysis as long as the sample is thin enough for transmission mode diffraction.

It has been suggested in the prior art of U.S. Pat. No. 7,885,373 that: "[i]n cases where too few diffraction spots can be observed in the diffraction ring, a large beam size or sample oscillation (by rotation or translation) may improve the sampling statistics" and that "[f]or samples with very large crystallite size relative to the X-ray beam size, the number of the spots on the diffraction ring may be too few to allow a reliable count. In this case, the effective sample volume can be increased to cover more crystallites by scanning the X-ray beam over a predetermined area of the sample or by collecting a diffraction frame at multiple target areas of the sample. In the multiple target method, one diffraction frame is collected by accumulating the diffracted X-rays at all of the multiple targets. Alternatively, multiple frames can be collected with one frame on each target, and then all frames added to produce one frame." All of the above noted measures, including rotation and/or translation during data collection, multiple targets, and multiple frames, have a single purpose, which is to increase the number of crystallites to be counted (and thereby increase the instrument window), so a crystallite size based on the average volume of crystallites can be calculated from $\gamma$ profiles with better statistics. However, the crystallite size distribution information cannot be obtained.

In order to measure crystallite size distribution, the present invention measures the size or volume of each and every crystallite covered by a set instrument window. Thus, all diffraction spots at various rocking angles are identified and traced, so that the diffraction intensities only relevant to the crystallite sizes are obtained. Certain examples are discussed in more detail below:

Rocking Curve with a 0D Detector

Figure 1B:
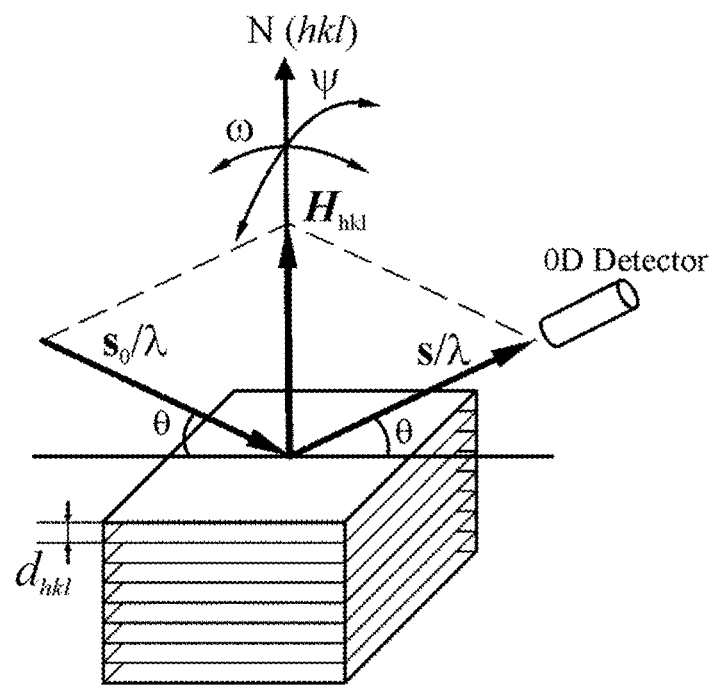
FIG. 1B is a schematic view of an X-ray diffraction method for collecting rocking curve diffraction data using a 0D detector.

In FIG. 1B, the incident X-rays hit the crystal planes with an incident angle $\theta$ and reflection angle $\theta$. The diffraction peak is observed when the Bragg condition, $2d_{hkl}\sin\theta=\lambda$, is satisfied, where $\lambda$ is the wavelength, $d_{hkl}$ is the distance between adjacent (hkl) crystalline planes (d-spacing), and $\theta$ is the Bragg angle at which one observes a diffraction peak. The vector $s_0/\lambda$ represents the incident X-ray beam and the vector $s/\lambda$ represents the scattered beam. N(hkl) is the normal of the crystalline plane (hkl). When the Bragg condition is satisfied, the diffraction vector $H_{hkl}$ is perpendicular to the crystal planes and the three vectors have the following relationship:

$$\frac{s-s_0}{\lambda} = H_{hkl} \qquad (4)$$

Figure 1C:
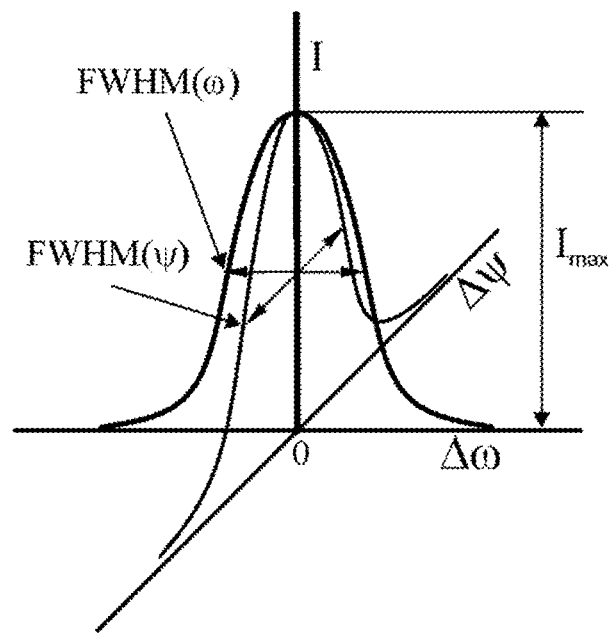
FIG. 1C is a graphical view of diffraction intensity as a function of each of rocking angles ω and ψ.

The intensity of the diffraction is given by the total counts or photons collected by the 0D detector and denoted by I. At the above perfect Bragg condition, the intensity is given as $I_{max}$. The normal of the crystal plane N(hkl) can be rotated (i.e., moved in the rocking direction) away from the orientation of the diffraction vector $H_{hkl}$ by either $\omega$ rotation or $\psi$ rotation in a typical X-ray diffractometer. When the crystal plane normal rotates away from the orientation of the diffraction vector $H_{hkl}$, the diffraction intensity collected by the 0D detector may not drop to zero immediately, but gradually as a function of the rocking angles $\Delta\omega$ or $\Delta\psi$. The rocking angles $\Delta\omega$ or $\Delta\psi$ are defined as the angular deviation from perfect Bragg condition. The diffraction intensity as a function of the rocking angle for each of $\Delta\omega$ and $\Delta\psi$ is plotted in FIG. 1C. The relationship between the diffraction intensity I and either rocking angle $\Delta\omega$ or $\Delta\psi$ is called a rocking curve. These rocking curves may be referred to, respectively, as rocking curve ($\omega$-scan) or rocking curve ($\psi$-scan), or simply the $\omega$-rocking curve or the $\psi$-rocking curve. The full width at the half maximum of the rocking curve in one of the rocking directions is given as FWHM ($\Delta\omega$) or FWHM($\Delta\psi$). The FWHM and the profile of the rocking curve are determined by the defects of the crystal (such as mosaicity) and the instrument condition (such as beam divergence).

Rocking Curve with a 2D Detector

Figure 2:
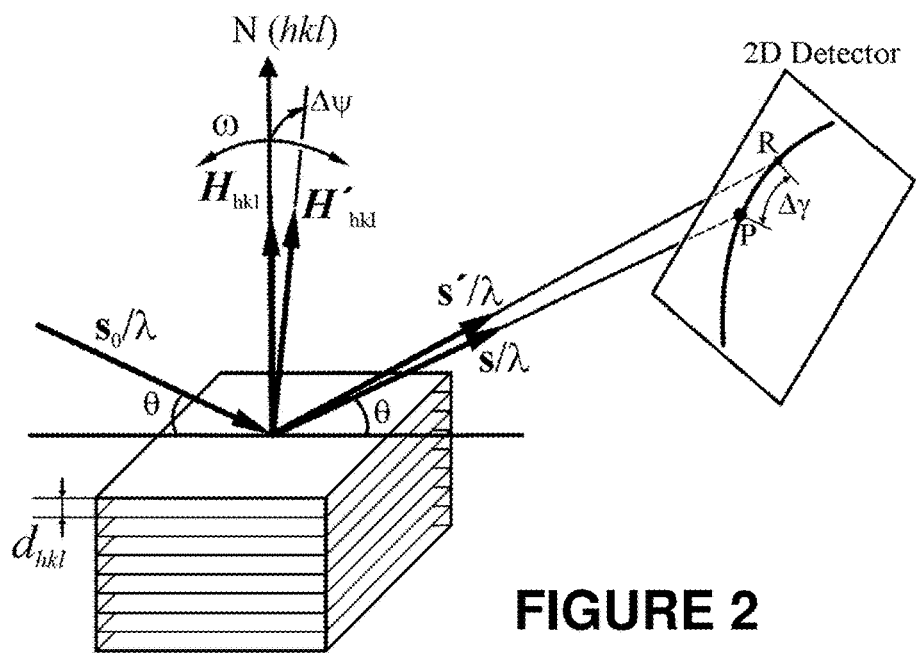
FIG. 2 is a schematic view of an X-ray diffraction method for collecting polycrystalline diffraction data using a 2D detector.

FIG. 2 illustrates the geometry for rocking curve collection with a 2D detector. The figure is schematic and, though oriented facing a back side of the detector, it shows an example of a diffraction image that is projected on the front of the detector (as if the detector were transparent). If the sample is a fine powder or polycrystalline material, a diffraction ring would be collected as shown in the image. For a single crystal at Bragg condition, spot P represents the location where the scattered X-ray beam (s/$\lambda$) hits the detection plane. The spot R along the trace of the diffraction ring represents a scattered X-ray beam (s'/$\lambda$) that deviates from the direction of (s/$\lambda$). The deviation in the 2D image is given by $\Delta\gamma$, as the $\gamma$ angle is used to define a location along the diffraction ring. Correspondingly, the diffraction vector $H'_{hkl}$ is deviated from the direction of $H_{hkl}$ by an angle of $\Delta\psi$. While the deviation in this example is due to a particular orientation of a crystallite of the sample, it is equivalent to rocking the crystal sample by $\psi$ rotation. The equivalent rocking angle is given as:

$$\Delta\psi = 2\arcsin\left[\cos\theta\sin\left(\frac{\Delta\gamma}{2}\right)\right] \qquad (5)$$

Therefore, because of the extent of the instrument window when using a two-dimensional detector, an equivalent $\psi$-rocking curve can be obtained from the intensity distribution along the trace of the diffraction ring, without actual $\psi$ rotation of the sample. The $\omega$-rocking curve can be collected in the same way as with a 0D detector by $\omega$-scan rotation.

Peak Finding Directly on the Selected 2D Image

Figure 3:
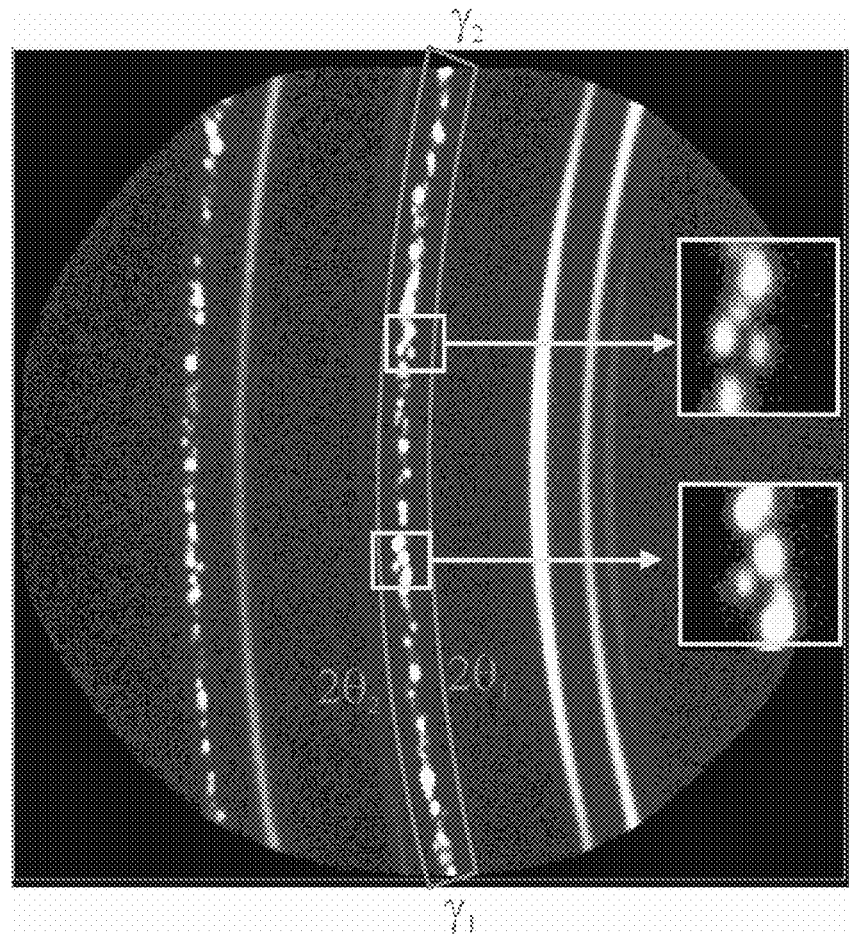
FIG. 3 is an image depicting an example X-ray diffraction frame with enlarged regions showing a localized distribution of diffraction spots resulting from crystallites in a polycrystalline sample.

In prior art methods, the number of contributing crystallites for a measured diffraction ring ($N_s$) is evaluated from the $\gamma$ profile produced by $2\theta$ integration. This method assumes all peaks within a selected diffraction ring have the same $2\theta$, i.e., with a peak intensity of the diffraction spots distributed along the diffraction ring. But, in reality, for many diffraction patterns, the diffraction spots from different crystallites may not align exactly on a constant $2\theta$ ring. FIG. 3 is a diffraction frame collected from a proprietary multilayer battery anode using a Bruker VANTEC-500 2D detector. It can be seen that not all the diffraction spots are aligned along a constant $2\theta$ ring. Some spots can be separated from other spots only because of different $2\theta$ values, as shown in the two enlarged regions in the figure. These spots can be distinguished in a high-resolution 2D image frame, but may be merged with other spots into a single peak in the γ-profile when using conventional methods. It is apparent, therefore, that the number of contributing crystallites for a measured diffraction ring ($N_s$) can be more accurately calculated directly from a 2D image.

There are many software programs that may be used to identify the peaks/spots. For example, many single crystal diffraction software programs have routines to evaluate the spots in a 2D diffraction pattern. Peak finding may involve a user-selected threshold for determination of a peak above the background, or other data process which should be similar for identifying spots for single crystal analysis. Once the number of diffraction spots $N_S$ is determined by peak finding software on the selected region defined by $2\theta_1$, $2\theta_2$, $\gamma_1$, $\gamma_2$ values, the crystallite sizes can be calculated with equations (2) or (3) above, depending on the diffraction mode.

Diffraction Intensity and Crystallite Size

Figure 4:
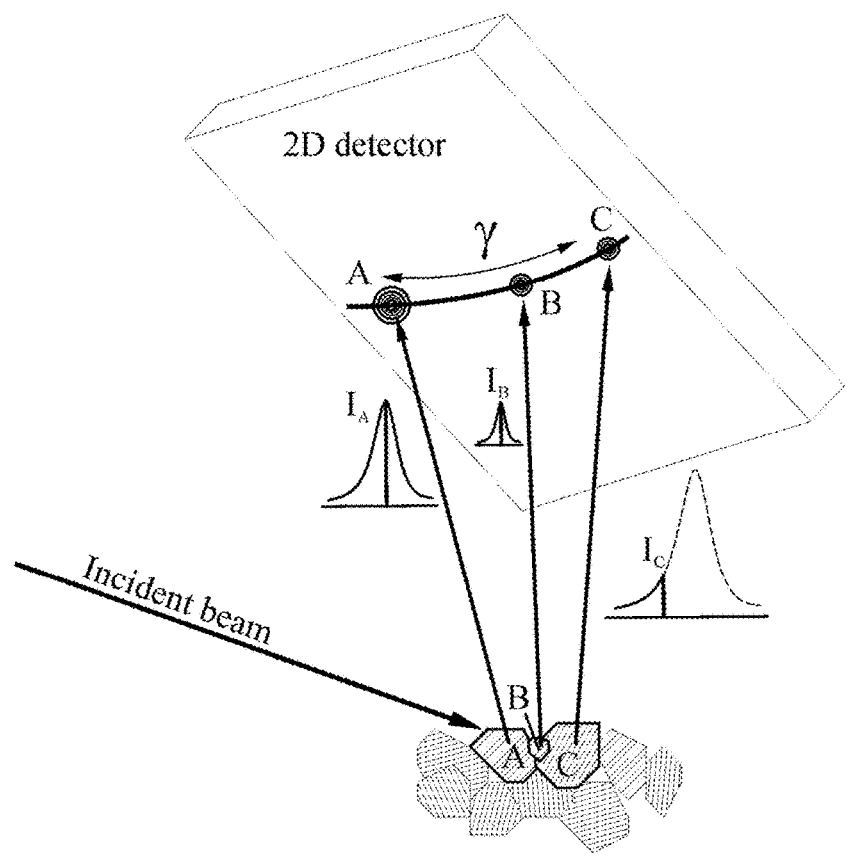
FIG. 4 is a schematic view depicting the diffraction spots produced on a 2D detector by several crystallites of a polycrystalline sample.

In the crystallite size measurement method of the prior art, it is assumed that all crystallites are in the same size range, such that the measured crystallite size represents an average value. In many cases, it would also be desirable to know the crystallite size distribution. The diffraction intensity of each spot is determined by at least two factors, one being the crystallite size and the other being the crystallite orientation relative to the diffraction vector. FIG. 4 shows the integrated diffraction intensity determined by crystallite size and orientation. The sample is a single-phase powder or polycrystalline. Assuming the incident X-ray beam has a cross-sectional size large enough to fully cover the crystallites A, B and C, three diffraction spots are produced respectively on the trace of the diffraction ring. The total X-ray counts within each diffraction spot represents the integrated intensity.

The crystallites A and B are oriented so that a perfect Bragg condition is met for the 2θ value of the diffraction ring and, as such, each has a corresponding maximum intensity that is detectable within the instrument window. However, due to the different sizes of the crystallites, the intensities of A and B are different. Generally speaking, without considering the effect of absorption and extinction, the integrated intensity is proportional to the volume of the crystallite. Therefore, the size of the crystallites A and B can be evaluated from the respective integrated intensities $I_A$ and $I_B$. The orientation of crystallite C cannot fully satisfy the Bragg condition within the instrument window, so the diffraction intensity measured is not proportional to the size of the crystallite. That is, the integrated intensity $I_C$ measured in the instrument window does not include the maximum diffraction intensity produced by crystallite C when in a perfect Bragg condition. Thus, an accurate crystallite size distribution cannot be determined simply by the peak intensities on the γ-profile or intensity variation of diffraction spots from a single diffraction pattern.

Maximum Intensity from each Crystallite Using Rocking Scan

Figure 5A:
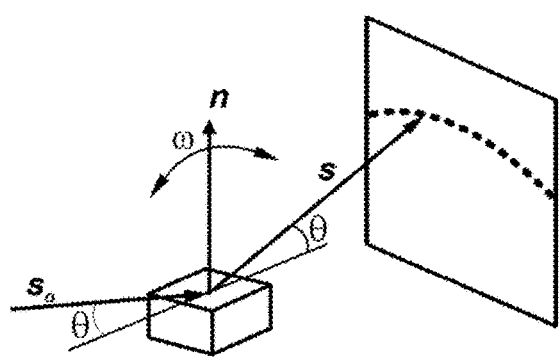
FIG. 5A is a schematic view of a rocking scan in a reflection mode X-ray diffraction method.
Figure 5B:
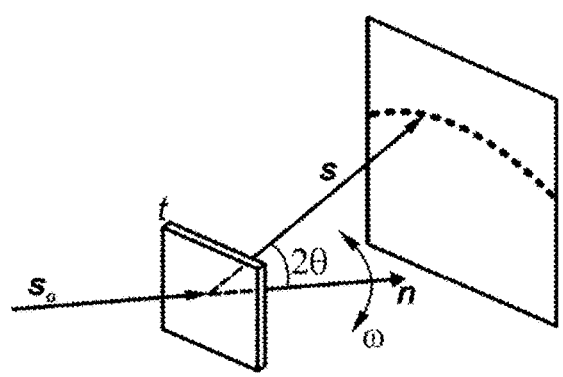
FIG. 5B is a schematic view of a rocking scan in a transmission mode X-ray diffraction method.

In order to evaluate the crystallite size distribution, the intensity of each crystallite should be measured at the peak of the rocking curve, $I_{max}$, for which the Bragg condition is fully met by the crystallite. With a two-dimensional detector, the rocking curve in the ψ-direction is substantially covered by the γ angular range and, therefore, an ω-scan is sufficient to include the peak of the rocking curve. FIG. 5A shows the rocking scan in reflection mode, while FIG. 5B shows the rocking scan in transmission mode. Reflection mode may be used with a sample that is so thick that only X-rays scattered by reflection are considered. In a typical configuration at neutral position, the sample surface normal n bisects the incident and scattered X-rays. The rocking scan is achieved by rotating the sample in the ω-direction so the surface normal n scans over a range of w in the vicinity of the neutral position.

In transmission mode, the sample must have a limited thickness t which allows the X-rays to pass through. In a typical configuration at neutral position, the incident X-ray beam is perpendicular to the sample surface. In another words, the sample normal n is in the same direction as the incident beam. The rocking scan is achieved by rotating the sample in the w direction so that the surface normal n scans over an angular range relative to the incident beam direction.

The transmission mode is preferred for crystallite size distribution measurement because the results are less affected by sample absorption. For a person skilled in the art, it will be apparent that the rocking scan can also be achieved by keeping the sample still, but moving the incident beam and detector relative to the sample orientation accordingly.

Figure 6:
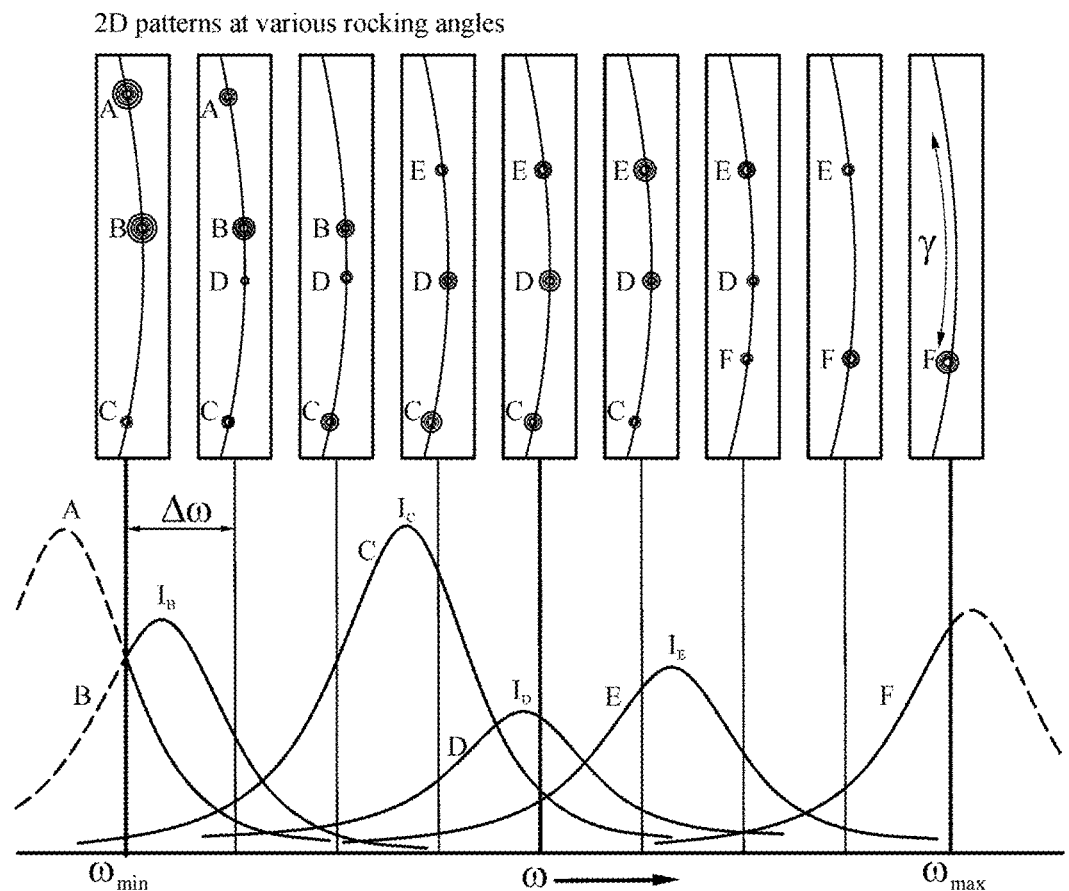
FIG. 6 is a schematic view of a method according the invention showing the collection of 2D X-ray diffraction patterns from crystallites of a polycrystalline material at various rocking angles along the w rocking angle direction.

FIG. 6 illustrates an exemplary method according to the invention for measuring $I_{max}$ for all crystallites counted for the crystallite size distribution. A series of 2D frames are measured at various w angles. A 2D diffraction frame may contain several diffraction rings. For clarity, only the region containing the specific diffraction ring is displayed. The ω-scan range is between $\omega_{min}$ and $\omega_{max}$. The ω-scan range should be sufficient so that the profile of the rocking curves can be determined. Therefore the scan range of at least two to three times the FWHM(ω) is advisable, although it is advantageous to use a significantly larger ω-scan range so that more crystallites can be evaluated. Δω is the scanning step. A relatively coarse step is displayed in the figure for easy illustration, but the actual steps should be much smaller so that the rocking curve and $I_{max}$ can be accurately determined. For instance, at least three to six steps should be used within a range of FWHM(ω).

In the example of FIG. 6, A total of six diffraction spots are observed during the rocking scan. In a real measurement, this number can be significantly higher. Among the six spots, the rocking curves of four spots (B, C, D and E) reach an intensity peak within the scanning range. The integrated intensity of the four spots can therefore be determined as $I_B$, $I_C$, $I_D$, and $I_E$. The spots A and F do not reach a maximum intensity within the scanning range, and are therefore not counted for the size distribution evaluation. Those skilled in the art will understand that the number of diffraction spots in real measurements is generally much higher. Algorithms and software for identifying the diffraction spots and evaluating their integrated intensity are widely available. A person skilled in the field should be able to adapt a specific algorithm or software program for the above purpose. The background of the diffraction pattern should also be subtracted to avoid the noise that it could otherwise add. A user-adjusted minimum intensity could also be applied as a threshold of identifying diffraction spots. The above evaluation results in a set of integrated intensity values (where i=1, 2, 3, . . . $N_S$), where $N_S$ is the total number of crystallites to be evaluated. In order to improve statistics, the above procedure can be done with multiple samples or various sample locations. All the data sets are combined to evaluate the size distribution with $N_S$ representing the total number of crystallites by all combined measurements.

Size Distribution from the Intensity Distribution

The diffraction intensity of a diffraction spot measured by the above method is proportional to the crystallite volume.

Therefore, the crystallite size distribution can be calculated from the intensity distribution using the following procedure:

Step 1—Calculate the Average Crystallite Size Mathematically

If the rocking range is made symmetric to $\omega_0$ and $\omega_0=\theta$, equation (2) can be used for the crystallite size measurement in reflection mode:

$$d = k\left\{\frac{p_{hkl}b^2\arcsin[\cos\theta\sin(\Delta\gamma/2)]}{2\mu N_s}\right\}^{1/3}$$

For transmission mode, if the incident beam is perpendicular to the sample and the w scan is within the vicinity of this condition, the equation (3) can be used for average crystallite size calculation:

$$d = k\left\{\frac{p_{hkl_i}b^2 t\arcsin[\cos\theta\sin(\Delta\gamma/2)]}{N_s}\right\}^{1/3}$$

Because the calibration factor k is affected by the rocking range, the calibration should be done with the same rocking scan. The sample used for the calibration should have a known uniform crystallite size or known crystallite size distribution. The procedure for calibration is the same as given in Bob He, *Two-dimensional X-ray Diffraction*, 2$^{nd}$ edition, John Wiley & Sons, 2018, except that the instrument window contains the effect of both beam divergence and rocking scan angular range.

Typically, a determination of the calibration factor k is done prior to a diffraction measurement used for the method described herein. Because the value of k is dependent on the diffractometer performance and the conditions of the measurement, a control sample having known parameters may be measured first. The results of this measurement are compared to expected results, and the manner and extent of any deviation is used to establish the calibration factor k. When thereafter used in the crystallite size calculation, as shown above, k provides correction for the deviation, allowing for an accurate measurement.

Step 2—Calculate the Size of Each Crystallite

The total intensity of all the evaluated spots should be proportional to the total volume calculated from the average volume of the crystallites, according to the following relations:

$$C \cdot \sum_{i=1}^{N_s} I_i = N_s \cdot v = N_s \cdot \frac{\pi}{6}d^3 \text{ and} \quad (7)$$

$$C = \frac{\pi N_s d^3}{6\sum_{i=1}^{N_s} I_i} \quad (8)$$

where C is the scaling factor between crystallite volume and intensity, v is the average crystallite volume and d is the size of a crystallite with the average volume. The volume of each crystallite can then be calculated by:

$$v_i = CI_i \quad (9)$$

where $v_i$ is the volume of the $i^{th}$ crystallite with a diffraction intensity of $I_i$. This yields:

$$d_i = \left(\frac{6}{\pi}CI_i\right)^{1/3} \text{ or} \quad (10)$$

$$d_i = d\left(\frac{N_s I_i}{\sum_{i=1}^{N_s} I_i}\right)^{1/3} \quad (11)$$

In the above equation, the shape of each crystallite is assumed to be spherical and, therefore, the relationship between crystallite size and volume is given as $$v = \frac{\pi}{6}d^3.$$

When a crystallite is of a different shape, the constant in the equation may be different than $$\frac{\pi}{6}.$$

For example, if the crystallite shape is ellipsoid, it may have one dimension of d and two other dimensions of cd and ed, where the constants c and e are scaling factors based on the shape of the ellipsoid. In such a case, the volume of the crystallite is given by $$v = \frac{\pi ce}{6}d^3$$

and the constant will be $$\frac{\pi ce}{6}$$

instead of $$\frac{\pi}{6}.$$

Since this constant is cancelled out in the final equation, equation (11) should be valid for any crystallite shape.

A 2D diffraction pattern typically contains several diffraction rings, each representing a crystalline plane of particular (hkl) index. The above method can be used for any diffraction ring or several diffraction rings. Because of the different orientation relationships between various (hkl) planes within the crystallite, various crystallite shapes and multiplicity factors of different (hkl) planes, the specific instrument settings and data collection strategy can be optimized in many ways by a person skilled in the field.

Display of the Crystallite Size Distribution

The size distribution data can be displayed in various formats depending on the field of application and preferences. For instance, the crystallite size distribution (CSD) may be displayed as the number of crystallites or the volume of the crystallites with respect to a specific size range (a form of "binning"). The CSD can also be displayed as the cumulative number of crystallites, or as a percentage of the total number of crystallites up to a given crystallite size.

Figure 7:
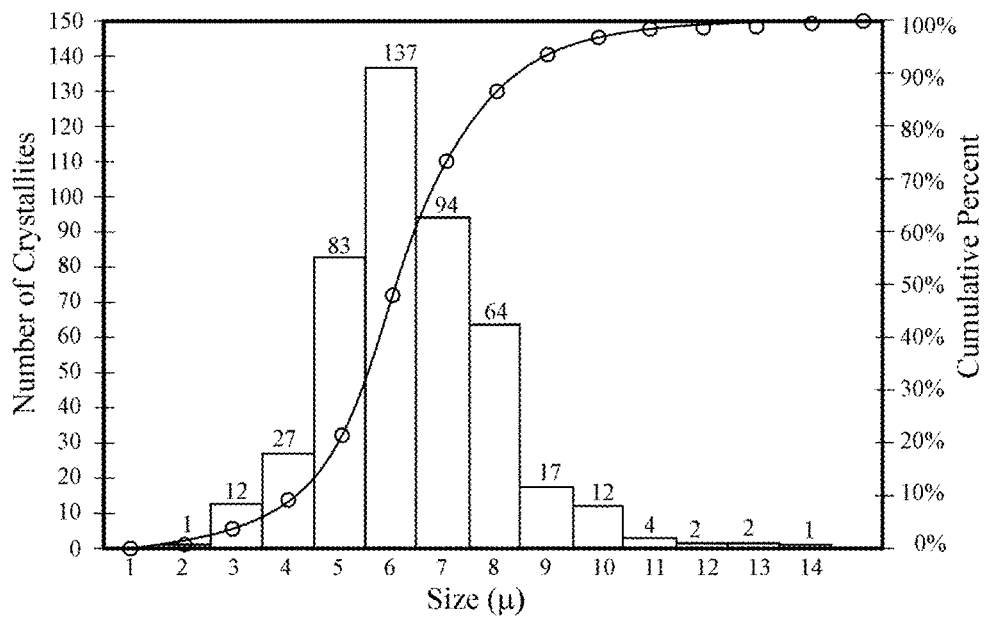
FIG. 7 is a graphical view showing different methods of displaying crystallite size distribution data acquired using the present invention.

FIG. 7 shows a crystallite size distribution as a histogram and a cumulative percentage. The left vertical axis shows the number of crystallites although, alternatively, frequency, population density or volume density can also be used. The horizontal axis indicates crystallite size. The histogram shows the number of crystallites within each "bin." In this example, an equal bin size of 1μ is used. The bin size for a specific experiment is chosen based on the statistics of each bin and the desired size resolution of the distribution. Typically, all bins are the same size, but a variable bin size in a histogram can also be used. The curve corresponding to the right vertical axis is the cumulative percentage of the crystallite size distribution.

The invention claimed is:

1. A method of determining crystallite size distribution in a sample of a polycrystalline material, the method comprising:
    providing an X-ray diffractometer with an X-ray beam source and a two-dimensional X-ray detector;
    positioning the sample at a first predetermined orientation relative to the X-ray beam source and detector such that crystallites in the sample produce diffraction spots on a detection surface of the detector, each diffraction spot corresponding to a different crystallite in the polycrystalline material;
    measuring the intensities of the diffraction spots within a defined detection window of the detector that includes a finite range of diffraction angles;
    rotating the sample in a rocking direction relative to the X-ray beam source and the detector and measuring the intensities of the diffraction spots at each of a plurality of different rocking angles along the rocking direction, an angular separation between adjacent rocking angles being such that each diffraction spot is measurable in the detection window at a plurality of said angles;
    recording a peak intensity value for each detected diffraction spot for which the detected intensities both increase and decrease across a continuous range of rocking angles;
    calculating a corresponding crystallite volume from each recorded peak diffraction intensity value; and
    determining the crystallite size distribution using said calculated crystallite volumes.

2. A method according to claim 1 wherein the X-ray diffractometer operates in transmission mode.

3. A method according to claim 1 wherein the X-ray diffractometer operates in reflection mode.

4. A method according to claim 1 wherein the rocking direction follows an angular direction about a first axis, and wherein the instrument window is sufficiently large to indicate intensity variations of diffraction spots corresponding to rotations of the sample in an angular direction about a second axis perpendicular to the first axis.

5. A method according to claim 1 wherein measuring the intensities of the diffraction spots comprises measuring the intensities of the diffraction spots only for those diffraction spots for which the intensity exceeds a predetermined threshold value.

6. A method according to claim 1 further comprising subtracting background noise from the detected intensities before recording the peak intensity values.

7. A method according to claim 1 further comprising repeating the steps of measuring diffraction spot intensities, rotating the sample and recording peak intensity values for a different starting location on the sample, and combining the results from the different measurements.

8. A method according to claim 1 wherein the sample is a first sample, and wherein the method further comprises repeating the steps of measuring diffraction spot intensities, rotating the sample and recording peak intensity values for a different sample of the polycrystalline material, and combining the results from the different measurements.

9. A method according to claim 1 wherein measuring the intensities of the diffraction spots comprises measuring the intensities of diffraction spots associated with a plurality of different diffraction rings.

10. A method according to claim 1 further comprising measuring a control sample prior to measurement of said sample of a polycrystalline material to determine a calibration factor k that is subsequently used in said calculating of a corresponding crystallite volume.

\* \* \* \* \*